US012366304B2

(12) United States Patent
Kawato et al.

(10) Patent No.: US 12,366,304 B2
(45) Date of Patent: Jul. 22, 2025

(54) SOLENOID VALVE

(71) Applicant: EAGLE INDUSTRY CO., LTD., Tokyo (JP)

(72) Inventors: Tadanobu Kawato, Tokyo (JP); Hiroyuki Iwanaga, Tokyo (JP); Masaki Hoshi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 89 days.

(21) Appl. No.: 18/277,378

(22) PCT Filed: Feb. 8, 2022

(86) PCT No.: PCT/JP2022/004923
§ 371 (c)(1),
(2) Date: Aug. 15, 2023

(87) PCT Pub. No.: WO2022/176710
PCT Pub. Date: Aug. 25, 2022

(65) Prior Publication Data
US 2024/0125405 A1    Apr. 18, 2024

(30) Foreign Application Priority Data
Feb. 16, 2021  (JP) .................. 2021-022850

(51) Int. Cl.
*F16K 27/02* (2006.01)
*F16K 1/12* (2006.01)
(Continued)

(52) U.S. Cl.
CPC .......... *F16K 27/029* (2013.01); *F16K 1/123* (2013.01); *F16K 31/0655* (2013.01); *F16K 27/12* (2013.01); *F16K 41/14* (2013.01)

(58) Field of Classification Search
USPC ....................... 251/129.07, 129.15
See application file for complete search history.

(56) References Cited

U.S. PATENT DOCUMENTS

| 1,049,845 A | 1/1913 | Geissinger ............ F16K 31/046 |
| 2,650,617 A | 9/1953 | Wasser .................. H01F 7/1607 |

(Continued)

FOREIGN PATENT DOCUMENTS

| CN | 205190900 | 4/2016 | ............ F16K 31/06 |
| JP | 55-65407 | 5/1980 | ............... H01F 7/13 |

(Continued)

OTHER PUBLICATIONS

Official Action issued in related U.S. Appl. No. 18/034,662, dated Aug. 19, 2023, 8 pages.

(Continued)

*Primary Examiner* — Matthew W Jellett
(74) *Attorney, Agent, or Firm* — HAYES SOLOWAY P.C.

(57) ABSTRACT

A solenoid valve includes: a valve body; a sleeve which the valve body is accommodated; a solenoid casing connected to the sleeve on a first end side in an axial direction of the solenoid valve, and is closed on a second end side opposed to the first end side in the axial direction; a solenoid molded body in the solenoid casing; a yoke including a tubular portion inside the solenoid molded body, a flange portion projecting radially outward from an end portion of the tubular portion on the second end side; a movable iron core, which moves in the axial direction inside the yoke. The valve body is moved with the iron core by energizing a coil of the solenoid molded body, and the flange portion has an annular outer peripheral surface that is continuous, and is disposed on the second end side of the solenoid molded body.

7 Claims, 4 Drawing Sheets

(51) Int. Cl.
*F16K 31/06* (2006.01)
*F16K 27/12* (2006.01)
*F16K 41/14* (2006.01)

(56) References Cited

U.S. PATENT DOCUMENTS

| | | | |
|---|---|---|---|
| 2,654,393 A | 10/1953 | Ghormley | F16K 31/408 |
| 2,700,397 A | 1/1955 | Compton | F16K 31/408 |
| 2,999,192 A | 9/1961 | Lambert | F16K 31/0655 |
| 3,446,473 A | 5/1969 | Barker | F16K 31/0651 |
| 3,462,116 A | 8/1969 | Wright | F16K 31/0651 |
| 3,827,672 A | 8/1974 | Stampfli | H01F 7/1607 |
| 3,926,405 A | 12/1975 | Arnold | F16K 31/0655 |
| 4,305,566 A | 12/1981 | Grawunde | F16K 31/406 |
| 4,319,211 A | 3/1982 | Ueda et al. | H01F 7/08 |
| 4,790,345 A | 12/1988 | Kolchinsky | F16K 31/0668 |
| 4,971,116 A | 11/1990 | Suzuki | G05D 16/2024 |
| 5,076,323 A | 12/1991 | Schudt | F16K 31/0637 |
| 5,135,027 A | 8/1992 | Miki et al. | F15B 13/044 |
| 5,413,308 A | 5/1995 | Hayes | F16K 31/0686 |
| 5,651,530 A | 7/1997 | Krimmer | H01F 7/1607 |
| 5,848,613 A | 12/1998 | Sakaguchi | F16K 31/0613 |
| 6,129,062 A | 10/2000 | Koda | F01L 1/34406 |
| 6,293,513 B1 | 9/2001 | Birkelund | F16K 31/408 |
| 6,315,268 B1 | 11/2001 | Cornea | H01F 7/081 |
| 6,367,434 B1 | 4/2002 | Steigerwald | F15B 13/0821 |
| 6,409,144 B1* | 6/2002 | Inami | H01F 7/081 335/255 |
| 6,619,615 B1 | 9/2003 | Mayr | H01F 7/1607 |
| 6,634,381 B2 | 10/2003 | Matsusaka | F16K 31/0624 |
| 6,811,137 B2 | 11/2004 | Hirata | F16K 31/0668 |
| 7,686,038 B2 | 3/2010 | Chavanne | F16K 31/0631 |
| 8,134,436 B2 | 3/2012 | Yasoshima | H01F 7/127 |
| 8,925,585 B2* | 1/2015 | Yasoshima | F16K 31/0613 137/625.65 |
| 8,998,167 B2 | 4/2015 | Leidig | F16K 31/0655 |
| 9,464,728 B2 | 10/2016 | Herrmann | F16K 31/00 |
| 9,601,252 B2* | 3/2017 | Irie | F16K 31/06 |
| 11,072,315 B2 | 7/2021 | Edelmann | F16K 39/024 |
| 11,320,061 B2 | 5/2022 | Nishimura | F16K 31/0655 |
| 2002/0007549 A1 | 1/2002 | Oishi et al. | 29/596 |
| 2005/0001189 A1 | 1/2005 | Takamatsu | F16K 31/0655 |
| 2006/0243938 A1 | 11/2006 | Ishibashi et al. | 251/129.15 |
| 2008/0308757 A1* | 12/2008 | Nakai | F16K 31/0613 251/129.15 |
| 2009/0032753 A1* | 2/2009 | Ishibashi | H01F 7/081 251/129.15 |
| 2009/0301588 A1* | 12/2009 | Shimizu | F16K 31/0613 137/625.69 |
| 2010/0308244 A1* | 12/2010 | Oikawa | F16K 11/0716 251/129.15 |
| 2010/0326552 A1 | 12/2010 | Suzuki | F16B 13/0402 |
| 2011/0073791 A1* | 3/2011 | Oikawa | H01F 7/1607 251/129.15 |
| 2011/0115587 A1 | 5/2011 | Ishibashi | 335/255 |
| 2011/0128104 A1 | 6/2011 | Yasoshima | H01F 3/00 |
| 2011/0147630 A1* | 6/2011 | Nisinosono | H01F 7/127 251/129.15 |
| 2012/0126158 A1 | 5/2012 | Yasoshima et al. | 251/129.15 |
| 2013/0181795 A1 | 7/2013 | Mitsumata et al. | H01F 7/081 |
| 2013/0200283 A1 | 8/2013 | Speer | F16K 31/08 |
| 2013/0306894 A1 | 11/2013 | Wei | F16K 31/0655 |
| 2016/0329143 A1 | 11/2016 | Irie et al. | H01F 7/081 |
| 2017/0248262 A1 | 8/2017 | Taniguchi | F16L 37/146 |
| 2018/0180194 A1 | 6/2018 | Lee et al. | F16K 31/06 |
| 2018/0372129 A1 | 12/2018 | Kato et al. | F15B 13/04 |
| 2020/0278045 A1 | 9/2020 | Nishimura et al. | F16K 31/0675 |

FOREIGN PATENT DOCUMENTS

| | | | |
|---|---|---|---|
| JP | 2-92907 | 7/1990 | H01F 7/16 |
| JP | 7-27246 | 1/1995 | F16K 31/06 |
| JP | 9-250650 | 9/1997 | F16K 31/06 |
| JP | 11-37333 | 2/1999 | F16K 31/08 |
| JP | 2002-27723 | 1/2002 | H02K 33/02 |
| JP | 2002-188747 | 7/2002 | F16K 31/06 |
| JP | 2006-307984 | 11/2006 | F16K 31/06 |
| JP | 2007-211857 | 8/2007 | F16K 31/06 |
| JP | 2010-106899 | 5/2010 | F16K 31/06 |
| JP | 2010-223279 | 10/2010 | F16K 31/06 |
| JP | 2011-108781 | 6/2011 | H01F 7/16 |
| JP | 2011-228568 | 11/2011 | H01F 7/16 |
| JP | 2012-122609 | 6/2012 | F16K 31/06 |
| JP | 2013-144999 | 7/2013 | F16K 31/06 |
| JP | 2014-110372 | 6/2014 | H01F 7/16 |
| JP | 2014-232768 | 12/2014 | H01F 7/16 |
| JP | 2015-75165 | 4/2015 | F16K 31/06 |
| JP | 2015-517631 | 6/2015 | H01F 7/16 |
| JP | 2015-137757 | 7/2015 | F16K 31/06 |
| JP | 2015-195301 | 11/2015 | H01F 7/16 |
| JP | 2016-211657 | 12/2016 | F16K 11/07 |
| JP | 2017-157791 | 9/2017 | H01K 42/02 |
| JP | 2019-7572 | 1/2019 | F16K 31/06 |
| WO | WO2015115298 | 8/2015 | H01K 7/06 |
| WO | WO2019017271 | 1/2019 | F16K 31/06 |
| WO | WO2019102908 | 5/2019 | F16K 31/06 |
| WO | WO2020110881 | 6/2020 | H01F 7/16 |

OTHER PUBLICATIONS

European Official Action issued in European Patent Application Serial No. 21889067.1, dated Aug. 6, 2024 (9 pages).
International Search Report and Written Opinion issued in PCT/JP2018/042066, dated Feb. 5, 2019, with English translation, 18 pgs.
International Preliminary Report on Patentability issued in PCT/JP2018/042066, dated May 26, 2020, English translation, 9 pages.
International Search Report and Written Opinion issued in PCT/JP2018/042065, dated Feb. 5, 2019, with English translation, 16 pgs.
International Preliminary Report on Patentability issued in PCT/JP2018/042065, dated May 26, 2020, English translation, 8 pgs.
International Search Report and Written Opinion issued in PCT/JP2020/030962, dated Nov. 2, 2020, with English translation, 14 pgs.
International Preliminary Report on Patentability issued in PCT/JP2020/030962, dated Mar. 10, 2022, English translation, 6 pgs.
International Search Report and Written Opinion issued in PCT/JP2021/039229, dated Nov. 16, 2021, with English translation, 13 pgs.
International Preliminary Report on Patentability issued in PCT/JP2021/039229, dated May 19, 2023, English translation, 6 pgs.
International Search Report, Written Opinion and International Preliminary Report on Patentability issued in PCT/JP2022/004923, dated Mar. 15, 2022, English translation, 24 pgs.
Official Action issued in related U.S. Appl. No. 16/754,734, dated Mar. 30, 2022, 29 pages.
Official Action issued in related U.S. Appl. No. 16/756,115, dated Sep. 15, 2021, 12 pages.
Official Action issued in related U.S. Appl. No. 16/756,115, dated Apr. 1, 2021, 9 pages.
Official Action issued in related U.S. Appl. No. 17/636,784, dated Mar. 30, 2023, 9 pages.
Chinese Official Action issued in corresponding Chinese Application Serial No. 201880065703.9, dated Jul. 14, 2021 (12 pages) with translation.
Chinese Official Action issued in corresponding Chinese Application Serial No. 201880065703.9, dated Jan. 27, 2022 (13 pages) with translation.
Chinese Official Action issued in Chinese Patent Application Serial No. 201880065470.2, dated Dec. 8, 2021 (12 pages) with translation.
Chinese Official Action issued in Chinese Patent Application Serial No. 201880065470.2, dated Jul. 2, 2021 (10 pages) with translation.
Japanese Official Action issued in Japanese Patent Application Serial No. 2019-555271, dated Mar. 10, 2022 (6 pages) with translation.

(56) References Cited

OTHER PUBLICATIONS

European Official Action issued in European Patent Application Serial No. 22756031.5, dated Dec. 3, 2024 (9 pages).
Notice of Allowance issued in related U.S. Appl. No. 18/034,662, dated Jan. 2, 2025, 8 pages.

* cited by examiner

SOLENOID VALVE

TECHNICAL FIELD

The present invention relates to a solenoid valve that controls a hydraulic fluid.

BACKGROUND ART

A valve used to control a hydraulic fluid in various industrial fields includes a valve seat and a valve body that can come into contact with and separate from the valve seat, and can control the pressure or flow rate of the hydraulic fluid by adjusting a valve opening degree.

Examples of representative valve forms of such a valve include a butterfly valve in which a valve body includes a rotating shaft, a lift valve in which a valve body moves orthogonal to a valve seat of a valve opening, and a spool valve in which a spool that is a valve body moves parallel to a valve seat of a valve opening. In the spool valve among these valves, since a movement direction of the spool and a flow direction of the hydraulic fluid intersect each other, and fluid pressure of the hydraulic fluid is unlikely to act in the movement direction of the spool, responsiveness of the spool to a driving force is improved.

For example, a solenoid valve of Patent Citation 1 is known as a spool valve. The solenoid valve of Patent Citation 1 is an oil-immersed solenoid valve that is attached to a mounting hole of a valve housing of a hydraulically controlled apparatus such as an automatic transmission for a vehicle in a horizontal direction, and that is immersed in a hydraulic oil inside the valve housing.

The solenoid valve of Patent Citation 1 mainly includes a valve unit including a spool having a columnar shape which is accommodated in a sleeve; and a solenoid unit that drives the spool. The solenoid unit includes a solenoid casing having a tubular shape, of which one axial end is connected to the sleeve; a solenoid molded body in which a coil is molded with resin and which is accommodated in the solenoid casing; a stator disposed on one axial end side inside the solenoid molded body; a side ring that is a yoke disposed on the other axial end side inside the solenoid molded body; a plunger that is a movable iron core disposed to be movable in an axial direction inside the side ring; and an end plate that closes the other end of the solenoid casing.

The side ring includes a tubular portion disposed inside the solenoid molded body, and a flange portion having an annular shape which projects radially outward from an end portion on an end plate side of the tubular portion, and a cutout portion is formed at a part of an outer edge of the flange portion. In addition, the solenoid molded body includes a connector portion projecting radially outward from a portion of the solenoid molded body in a circumferential direction. The side ring and the solenoid molded body can be integrally assembled in a state where a relative movement thereof in the circumferential direction is restricted by fitting an end portion of the solenoid molded body to the cutout portion.

When the coil is in a non-energized state, the spool is biased toward the end plate side by a spring provided in the valve unit. In addition, when the coil is in an energized state, a magnetic circuit is formed by the solenoid casing, the stator, the side ring, and the plunger, and a magnetic force is generated between the stator and the plunger, so that the plunger is moved toward a stator side, and accordingly, the spool is moved opposite the end plate against a biasing force of the spring, and the amount of the hydraulic fluid flowing from an input port to an output port of the sleeve can be changed.

CITATION LIST

Patent Literature

Patent Citation 1: International Publication WO 2019/017271 (PAGE 6, FIG. 1)

SUMMARY OF INVENTION

Technical Problem

However, in the solenoid valve of Patent Citation 1, since the cutout portion to which the end portion of the solenoid molded body is fitted is formed in the flange portion of the side ring, magnetic resistance between the cutout portion of the flange portion and the solenoid casing is increased, so that a magnitude of a magnetic force generated between the plunger and the stator is not uniform in the circumferential direction, and movement of the plunger is affected, which is a problem.

The present invention is conceived in view of such a problem, and an object of the present invention is to provide a solenoid valve capable of acting a magnetic force on a movable iron core in a well-balanced manner.

Solution to Problem

In order to solve the foregoing problem, a solenoid valve according to the present invention includes: a valve body; a sleeve in which the valve body is accommodated; a solenoid casing which is connected to the sleeve on a first end side in an axial direction of the solenoid valve, and which is closed on a second end side opposed to the first end side in the axial direction; a solenoid molded body accommodated in the solenoid casing; a yoke including a tubular portion disposed inside the solenoid molded body, and a flange portion projecting radially outward from an end portion of the tubular portion on the second end side; and a movable iron core disposed to be movable in the axial direction inside the yoke, wherein the valve body is moved together with the movable iron core by energizing a coil of the solenoid molded body, and the flange portion has an annular outer peripheral surface that is continuous, and is disposed on the second end side of the solenoid molded body. According to the aforesaid feature of the present invention, since the annular outer peripheral surface of the flange portion is continuously formed in an annular shape, the flange portion has a uniform shape in a circumferential direction, so that a magnetic efficiency can be improved, and a magnetic force can act on the movable iron core in a well-balanced manner. In addition, since the solenoid molded body and the yoke can be separately assembled, a relative assembly direction of the solenoid molded body and the yoke is not limited, and assembly work can be easily performed.

It may be preferable that an end portion of the solenoid casing on the second end side is closed by a lid member, and the lid member and the flange portion abut each other in an annular shape in the axial direction. According to this preferable configuration, since a wide annular abutting area between the lid member and the flange portion can be ensured, contaminations are unlikely to intrude into a space on a lid member side of the movable iron core.

It may be preferable that the lid member is made of a magnetic material. According to this preferable configuration, since the lid member is made of a magnetic material, the magnetic efficiency can be improved, and a magnetic force can act on the movable iron core in a well-balanced manner.

It may be preferable that an end portion of the solenoid casing on the second end side is closed by the flange portion. According to this preferable configuration, since the end portion of the solenoid casing on the second end side is closed by the flange portion of the yoke, the magnetic efficiency can be improved, and a magnetic force can act on the movable iron core in a well-balanced manner.

It may be preferable that the flange portion is crimp-fixed to the solenoid casing. According to this preferable configuration, a magnetic circuit can be reliably formed between the flange portion and the solenoid casing.

It may be preferable that a space on the second end side of the movable iron core does not communicate with and is partitioned off from an external space of the solenoid casing, a through-hole that allows communication between the space on the second end side of the movable iron core and a space on the first end side of the movable iron core is formed in the movable iron core, and the flange portion includes a protrusion that is abuttable with respect to a portion of the movable iron core different from the through-hole. According to this preferable configuration, when the movable iron core has moved to the second end side in the axial direction, since the movable iron core abuts the protrusion and the through-hole is not closed by the flange portion, a fluid can smoothly move between the space on the first end side of and the space on the second end side of the movable iron core.

DESCRIPTION OF EMBODIMENTS

Figure 1:
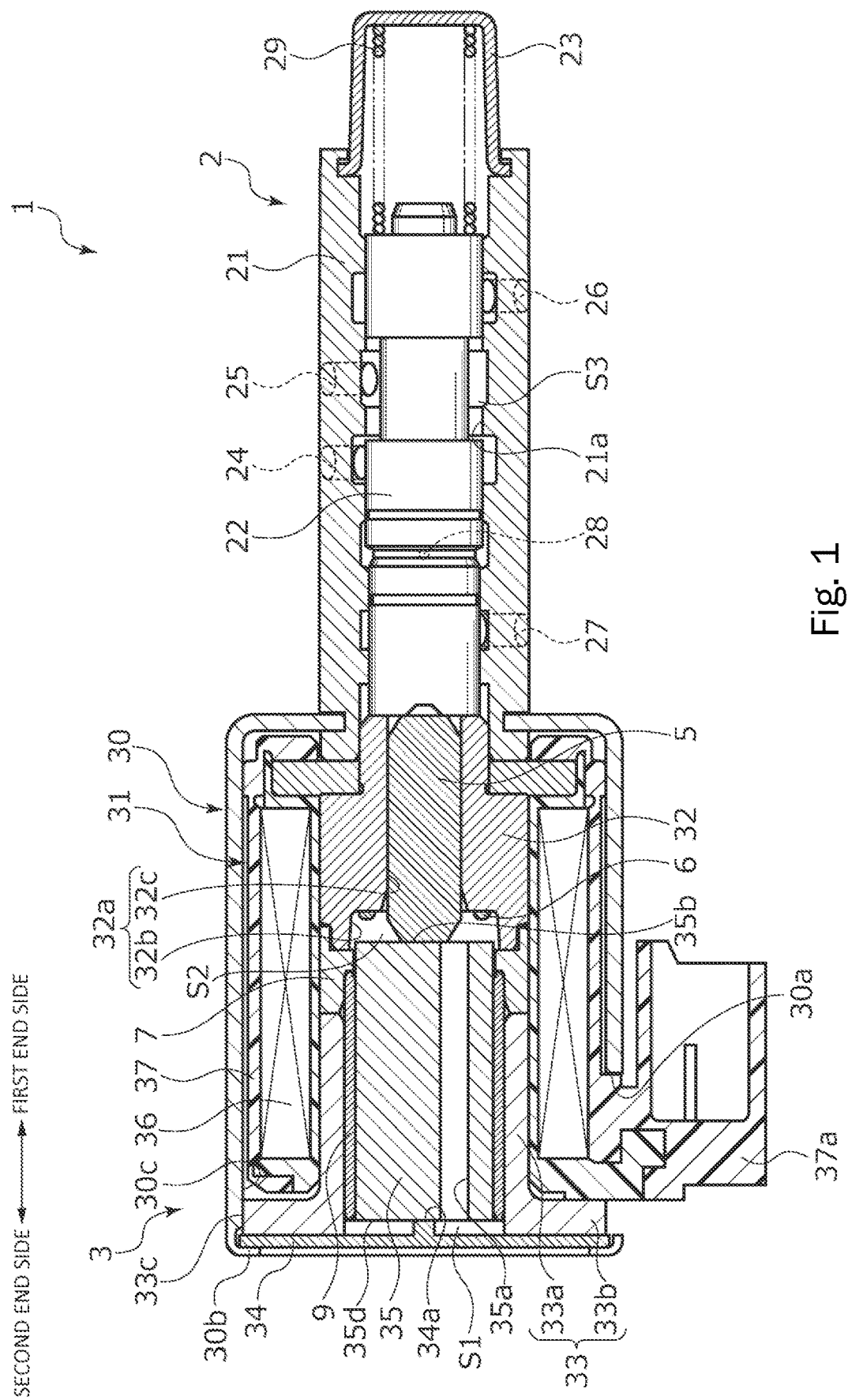
FIG. 1 is a cross-sectional view illustrating a solenoid valve according to a first embodiment of the present invention.

Modes for implementing a solenoid valve according to the present invention will be described below based on embodiments.

First Embodiment

A solenoid valve according to a first embodiment of the present invention will be described with reference to FIGS. 1 and 2. Hereinafter, the right side of the drawing sheet of FIG. 1 and the left side of the drawing sheet of FIG. 1 will be described as one axial end side of the solenoid valve and the other axial end side of the solenoid valve, respectively.

As illustrated in FIG. 1, a solenoid valve 1 according to the first embodiment of the present embodiment is a spool-type solenoid valve and is used in, for example, a hydraulically controlled apparatus such as an automatic transmission for a vehicle. Incidentally, the solenoid valve 1 is used as a so-called oil-immersed solenoid valve that is attached to a mounting hole of a valve housing on an apparatus side in a horizontal direction, and that is immersed in a hydraulic oil which is a liquid inside the valve housing.

The solenoid valve 1 is configured such that a valve unit 2 which adjusts the flow rate of a fluid, namely, a control fluid such as a hydraulic oil is integrally attached to a solenoid unit 3. Incidentally, FIG. 1 illustrates an OFF state of the solenoid valve 1 in which a coil 36 of a solenoid molded body 31 is not energized.

First, a structure of the valve unit 2 will be described. As illustrated in FIG. 1, the valve unit 2 includes a sleeve 21 provided with openings of various ports such as an input port 24, an output port 25, a discharge port 26, a drain port 27, and a feedback port 28 that are connected to flow passages provided in the mounting hole of the valve housing; a spool 22 as a valve body that is liquid-tightly accommodated in a through-hole 21a formed in an axial direction on a radially inner side of the sleeve 21; a spring 29 having a coil shape which biases the spool 22 toward the other axial end side; and a retainer 23 that holds the spring 29.

In the sleeve 21, the discharge port 26, the output port 25, the input port 24, the feedback port 28, and the drain port 27 are formed in order from the one axial end side toward the other axial end side. The spool 22 is reciprocatable in the axial direction, and the spool 22 is reciprocated in the axial direction to change communication states of the various ports and to control the pressure or flow rate of the hydraulic oil. Incidentally, the sleeve 21, the spool 22, and the retainer 23 are made of a material such as aluminum, iron, stainless steel, or resin.

Next, a structure of the solenoid unit 3 will be described. As illustrated in FIG. 1, the solenoid unit 3 mainly includes a solenoid casing 30 having a tubular shape; the solenoid molded body 31 accommodated in the solenoid casing 30; a stator 32 disposed on the one axial end side inside the solenoid molded body 31; a side ring 33 as a yoke disposed on the other axial end side inside the solenoid molded body 31; an end plate 34 as a lid member that closes an opening at the other axial end of the solenoid casing 30; and a plunger 35 as a movable iron core that is disposed to be movable in the axial direction in a space surrounded by the stator 32, a tubular body 7 to be described later, the side ring 33, and the end plate 34.

The solenoid casing 30 is a tubular body made of a metal material having a magnetic property such as iron, and the sleeve 21 is connected to one axial end of the solenoid casing 30. In addition, an opening 30a penetrating through the solenoid casing 30 in a radial direction is formed in a lower portion at the other axial end of the solenoid casing 30 by cutting out the solenoid casing 30 from the other axial end side (refer to FIG. 2).

In addition, a crimping portion 30b having a C shape in an axial view is provided at the other axial end of the solenoid casing 30, namely, at a portion other than the opening 30a, and the crimping portion 30b is crimped on a radially inner side, so that the end plate 34 is sandwiched between the crimping portion 30b and a flange portion 33b of the side ring 33.

The end plate 34 is made of a metal material having a magnetic property such as iron, and is a disc having a slightly larger diameter than that of the flange portion 33b of the side ring 33. A protrusion 34a protruding toward a plunger 35 side is formed on a radial center of the end plate 34.

The solenoid molded body 31 is formed by molding the coil 36 with resin 37, and includes a connector portion 37a projecting from the other radial end of the solenoid molded body 31 in a radially outward direction, and having a substantially L-shaped cross section formed by a root portion and a terminal portion. The root portion of the connector portion 37a is fitted to the opening 30a of the solenoid casing 30 from the other axial end side, and the terminal portion of the connector portion 37a is disposed to extend toward the one end side (also referred to as a first end side) outside the solenoid casing 30. A control electric current is supplied to the coil 36 from the terminal portion of the connector portion 37a.

The stator 32 is a tubular body having a through-hole 32a with a step in a central portion thereof, the through-hole 32a penetrating therethrough in the axial direction, and is made of a metal material having a magnetic property such as iron. In the through-hole 32a, a portion on the other end side (also referred to as a second end side) in the axial direction is a large-diameter hole portion 32b, and a portion on the one axial end side is a small-diameter hole portion 32c having a smaller diameter than that of the large-diameter hole portion 32b.

In addition, a damper member 6 having a ring shape which is made of a non-magnetic material such as resin or rubber is firmly fixed to an annular surface of the stator 32, the annular surface being orthogonal to the axial direction and being formed between an inner peripheral surface forming the large-diameter hole portion 32b and an inner peripheral surface forming the small-diameter hole portion 32c. In addition, the other axial end of the spool 22 can come into contact with one axial end of the stator 32, and the movement of the spool 22 toward the other axial end side is restricted.

The side ring 33 is made of a metal material having a magnetic property such as iron. In the side ring 33, a tubular portion 33a that extends in the axial direction and that is disposed inside the solenoid molded body 31, and the flange portion 33b having an annular shape which projects radially outward from the other axial end of the tubular portion 33a, namely, an end portion on an end plate 34 side are formed. The flange portion 33b is disposed on the other axial end side with respect to the solenoid molded body 31.

Figure 2:
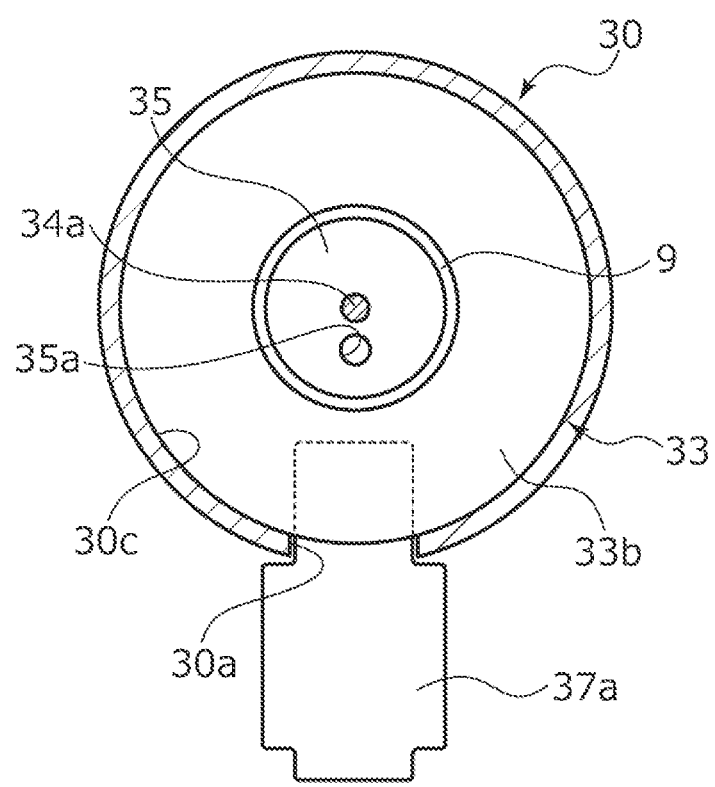
FIG. 2 is a partial cross-sectional view of the solenoid valve when viewed on the second end side in the axial direction.

As illustrated in FIGS. 1 and 2, the flange portion 33b is formed such that an outer circumference and an inner circumference are concentric with each other and a thickness is substantially constant, and an annular outer peripheral surface 33c of the flange portion 33b continuously extends in a circumferential direction in an annular shape. In other words, the flange portion 33b has the annular outer peripheral surface 33c without a cutout portion, and is formed in a ring shape in an axial view. Namely, the annular outer peripheral surface 33c of the flange portion 33b is in arc contact with an inner peripheral surface 30c of the solenoid casing 30.

In addition, a lower portion of the annular outer peripheral surface 33c of the flange portion 33b, namely, a part of the annular outer peripheral surface 33c in the circumferential direction is exposed to the outside through the opening 30a of the solenoid casing 30.

In addition, the tubular body 7 made of a non-magnetic material is disposed between the stator 32 and the side ring 33. A bushing 9 made of a non-magnetic material is disposed over the tubular body 7 and the side ring 33 inside the tubular body 7 and the side ring 33.

The plunger 35 is formed in a columnar shape from a metal material having a magnetic property such as iron, and is slidably disposed inside the bushing 9. An outer peripheral surface of the plunger 35 and an inner peripheral surface of the bushing 9 are slightly separated from each other.

A space S1 that does not communicate with and is partitioned off from an external space of the solenoid casing 30 is formed on the other axial end side of the plunger 35, and a space S2 that does not communicate with and is partitioned off from the external space of the solenoid casing 30 is formed on one axial end side of the plunger 35. A through-hole 35a penetrating through the plunger 35 in parallel to a central axis is formed in the plunger 35 at an eccentric position, and allows communication between the space S1 and the space S2.

Specifically, the space S1 is partitioned off by the plunger 35, the side ring 33, and the end plate 34, and the space S2 is partitioned off by the plunger 35, the through-hole 32a of the stator 32, and the spool 22. Incidentally, a space S3 inside the sleeve 21 is partitioned off from the spaces S1 and S2 by the spool 22.

The other end of the rod 5 that is slidably inserted into the small-diameter hole portion 32c of the stator 32 is in contact with an end surface 35b on the one end side of the plunger 35, and one end of the rod 5 abuts the other end of the spool 22. Incidentally, the one end of the rod 5 may not abut the end surface 35b on the one end side of the plunger 35 when an electric current is turned off.

Figure 3A:
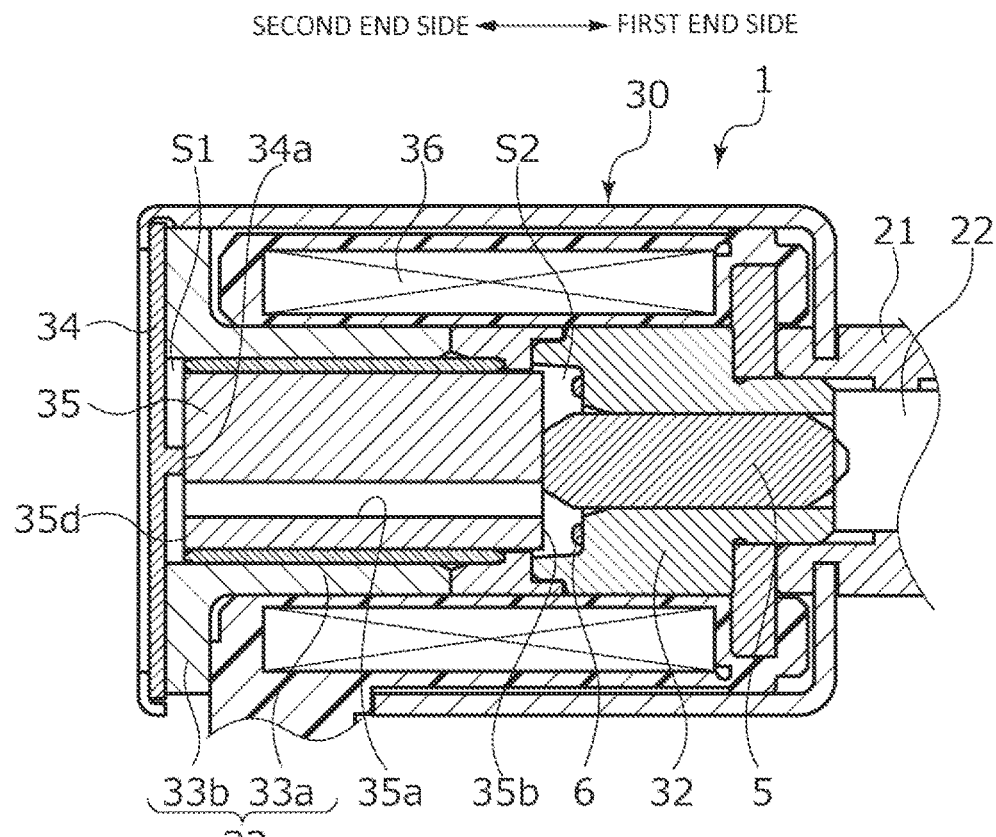
FIGS. 3A and 3B are main part enlarged side cross-sectional views illustrating an OFF state of the solenoid valve and an ON state of the solenoid valve, respectively.

Next, an operation of the solenoid valve 1 will be described. As illustrated in FIG. 3A, in an OFF state of the solenoid valve 1, the spool 22 is biased toward the other axial end side by a biasing force of the spring 29 (refer to FIG. 1), and accordingly, the plunger 35 and the rod 5 are moved to the other axial end side.

At this time, the protrusion 34a of the end plate 34 abuts a center of an end surface 35d on the other axial end side of the plunger 35. Specifically, the protrusion 34a of the end plate 34 abuts the end surface 35d of the plunger 35 at a position different from that of the through-hole 35a, and accordingly, the movement of the plunger 35 toward the other axial end side is restricted.

Figure 3B:
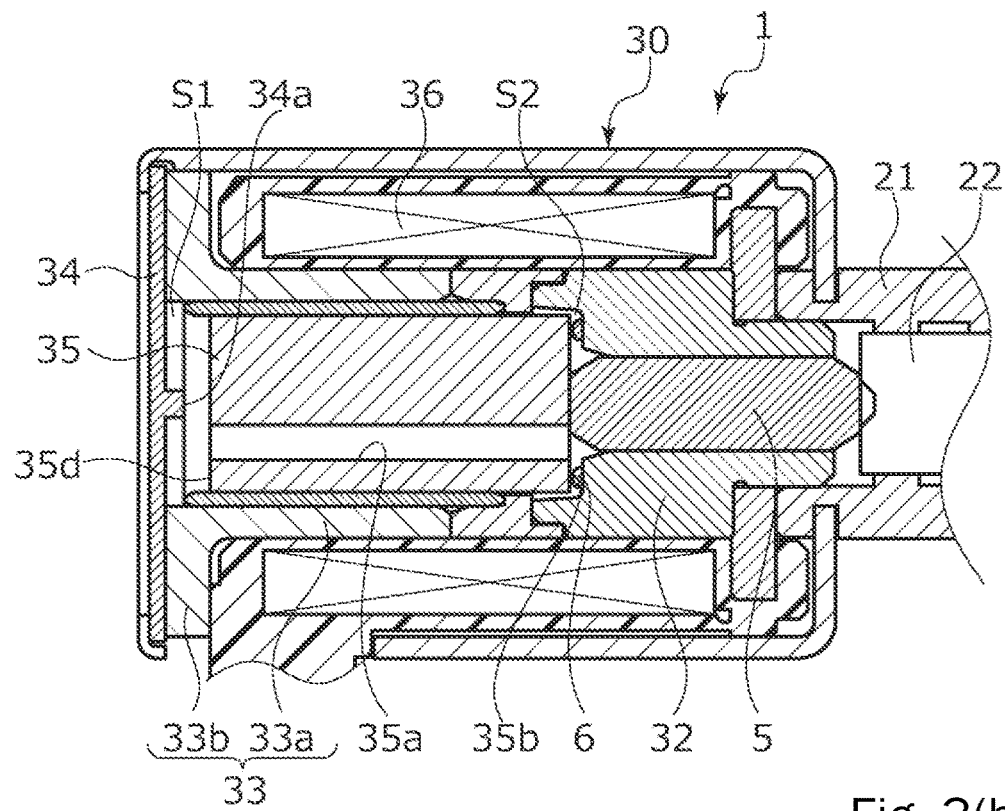

As illustrated in FIG. 3B, in an ON state of the solenoid valve 1, since the coil 36 is energized, a magnetic circuit is formed by the solenoid casing 30, the end plate 34, the side ring 33, the plunger 35, and the stator 32, and a magnetic force is generated between the stator 32 and the plunger 35, so that the plunger 35 and the rod 5 move toward a stator 32 side in the axial direction.

Accordingly, the one axial end of the rod 5 pushes an end surface on the other axial end side of the spool 22 to move the spool 22 toward the one axial end side against the biasing force of the spring 29, thereby being able to change the amount of the control fluid flowing from the input port 24 to the output port 25 of the sleeve 21. Incidentally, the end surface 35b of the plunger 35 abuts the damper member 6, so that the movement of the plunger 35 toward the one axial end side is restricted.

In addition, when the spool 22 has moved to the one axial end side, the fluid in the space S2 moves to the space S1 through the through-hole 35a of the plunger 35. Accordingly, the fluid in the space S2 can be prevented from becoming resistance to movement of the plunger 35 toward the one axial end side, and responsiveness of the solenoid valve 1 can be improved.

In addition, when the coil 36 is de-energized and the magnetic force generated between the stator 32 and the plunger 35 becomes relatively weak, the spool 22 is moved toward the other axial end side by the biasing force of the spring 29, and accordingly, the plunger 35 and the rod 5 move toward the other axial end side (refer to FIGS. 1 and 3A). At this time, the fluid in the space S1 flows to the space S2 through the through-hole 35a of the plunger 35. Accordingly, the fluid in the space S1 can be prevented from becoming resistance to movement of the plunger 35 toward the other axial end side, and responsiveness of the solenoid valve 1 can be improved.

As described above, the flange portion 33b of the side ring 33 has the annular outer peripheral surface 33c that is continuous, and is disposed on the other end side of the solenoid molded body 31. According to this configuration, since the annular outer peripheral surface 33c of the flange portion 33b is continuously formed in an annular shape, a cutout is not formed in the flange portion 33b, and the flange portion 33b has a uniform shape in the circumferential direction, so that a magnetic efficiency is good and a magnetic force can act on the plunger 35 in a well-balanced manner.

In addition, since the side ring 33 has a uniform shape in the circumferential direction, a relative circumferential assembly direction of the solenoid molded body 31 and the side ring 33 is not limited, and assembly work can be easily performed.

In addition, since the end plate 34 abuts the flange portion 33b in an annular shape in the axial direction, the flange portion 33b having an annular shape in an axial view in which a cutout is not formed, a wide abutting area can be ensured, and contaminations are unlikely to intrude into the space S1.

In addition, since the end plate 34 is made of a magnetic material, the volume of portions forming a magnetic circuit is large, and the magnetic efficiency is improved. Further, since the end plate 34 has a disc shape without a cutout in the circumferential direction, a magnetic force can act on the plunger 35 in a well-balanced manner.

In addition, since the end plate 34 is sandwiched between the crimping portion 30b of the solenoid casing 30 and the flange portion 33b of the side ring 33, a magnetic circuit can be reliably formed between the solenoid casing 30, the end plate 34, and the flange portion 33b of the side ring 33.

In addition, the spaces S1 and S2 that do not communicate with and are partitioned off from the external space of the solenoid valve 1 are formed on both respective axial sides of the plunger 35, and the through-hole 35a that allows communication between the space S1 and the space S2 is formed in the plunger 35. In addition, the protrusion 34a protruding toward the plunger 35 side is formed on the end plate 34, and the protrusion 34a abuts the end surface 35d of the plunger 35 at a position different from that of the through-hole 35a.

According to this configuration, when the plunger 35 has moved to the end plate 34 side, since the plunger 35 abuts the protrusion 34a, the through-hole 35a of the plunger 35 is not closed by the end plate 34, so that the fluid can smoothly move between the space S2 on the one axial end side and the space S1 on the other axial end side of the plunger 35. In addition, since the spaces S1 and S2 that do not communicate with and are partitioned off from the external space of the solenoid valve 1, contaminations are unlikely to intrude from the external space.

In addition, the solenoid casing 30 includes the opening 30a through which the connector portion 37a of the solenoid molded body 31 extends, the connector portion 37a projecting in the radially outward direction, and the lower portion of the annular outer peripheral surface 33c of the flange portion 33b, namely, a part of the annular outer peripheral surface 33c in the circumferential direction is exposed to the outside through the opening 30a of the solenoid casing 30.

According to this configuration, since a part of the annular outer peripheral surface 33c of the flange portion 33b is exposed to the outside through the opening 30a, magnetic fluxes generated between the solenoid casing 30 and the flange portion 33b at the opening 30a are unlikely to be blocked by the connector portion 37a, and magnetic fluxes are easily generated in a well-balanced manner. In addition, since the connector portion 37a does not interfere with the flange portion 33b when the solenoid valve 1 is assembled, assembly work can be easily performed.

In addition, since the other end surface of the connector portion 37a is formed to be flush with the other end surface of a portion of the solenoid molded body 31 in the radial direction, the portion being disposed inside the solenoid casing 30 in the radial direction, the connector portion 37a is easily manufactured.

In addition, since the other end surface of the connector portion 37a is located on the one axial end side with respect to the flange portion 33b of the side ring 33, the opening 30a serves as a relief margin when the solenoid casing 30 is deformed by a force acting when crimping is performed, and as a region where a crimping jig is movable, and the crimping portion 30b can be easily crimped even in the vicinity of the opening 30a.

Incidentally, in the present embodiment, a mode has been provided in which the end plate 34 is made of a magnetic material, but the end plate may be made of a non-magnetic material such as resin.

Second Embodiment

Figure 4:
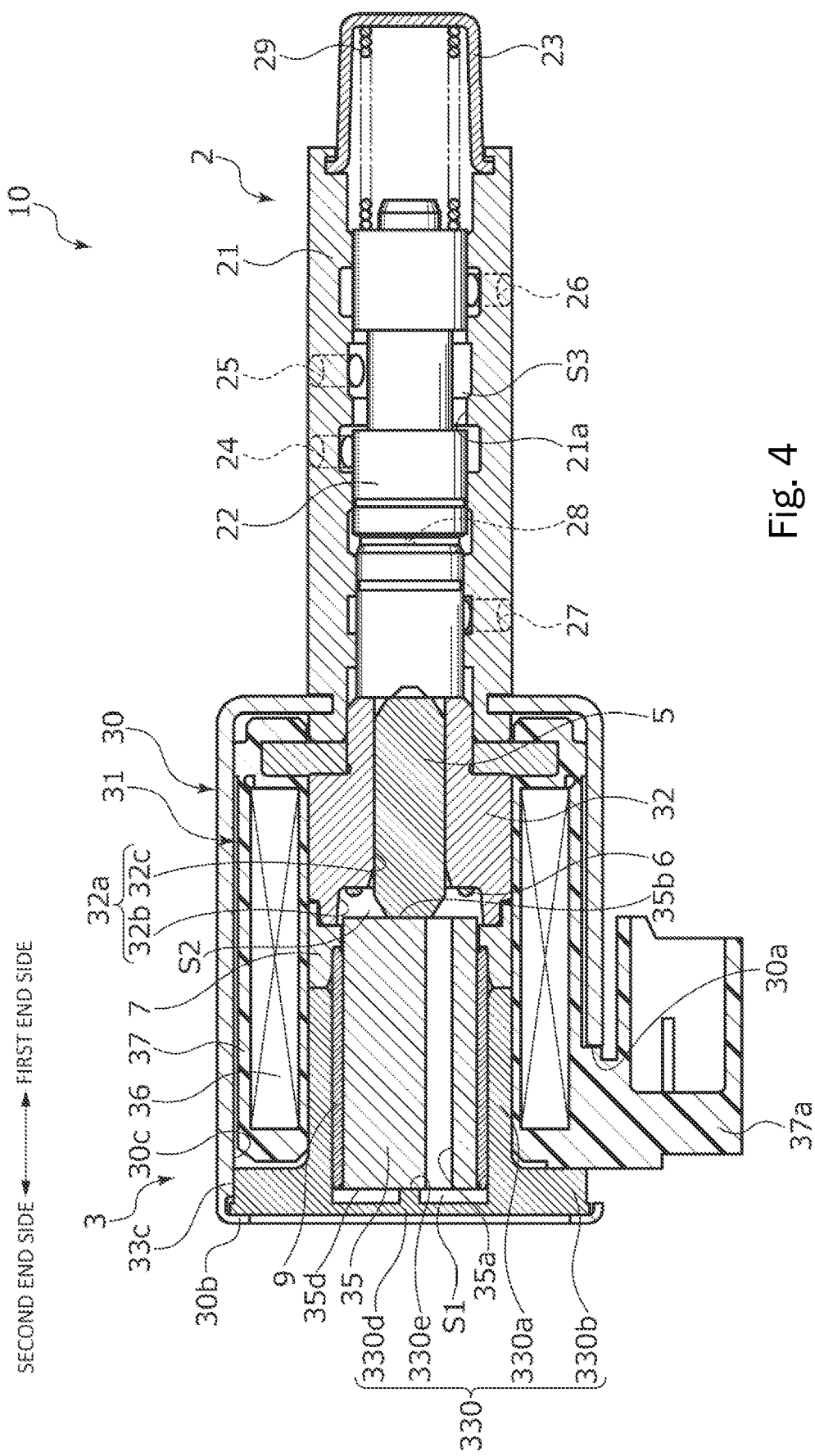
FIG. 4 is a side cross-sectional view illustrating a solenoid valve according to a second embodiment of the present invention.

Next, a solenoid valve according to a second embodiment of the present invention will be described with reference to FIG. 4. Incidentally, a description of duplicated configurations that are the same as the configurations of the foregoing embodiment will be omitted.

A side ring 330 of a solenoid valve 10 according to the second embodiment of the present invention includes a tubular portion 330a disposed inside the solenoid molded body 31; a flange portion 330b projecting radially outward from the other axial end of the tubular portion 330a; and a lid portion 330d that closes an opening of the flange portion 330b. The lid portion 330d has a thinner thickness in the axial direction than that of the flange portion 330b, and an end surface on the other axial end side of the lid portion 330d extends to be flush with an end surface on the other axial end side of the flange portion 330b.

In addition, a protrusion 330e protruding toward the plunger 35 side is formed on a radial center of the lid portion 330d. In an OFF state of the solenoid valve 10, the protrusion 330e abuts the end surface 35d of the plunger 35 at a position different from that of the through-hole 35a.

The flange portion 330b of the side ring 330 is sandwiched between the crimping portion 30b and the other axial end surface of the solenoid molded body 31 by crimping the crimping portion 30b of the solenoid casing 30.

In such a manner, since the other axial end of the solenoid casing 30 is closed by the lid portion 330d forming a part of the flange portion 330b, the volume of portions forming a magnetic circuit is increased to improve the magnetic efficiency, and a magnetic force can act on the plunger 35 in a well-balanced manner.

In addition, since the flange portion 330b of the side ring 330 is crimp-fixed by the crimping portion 30b of the solenoid casing 30, a magnetic circuit can be reliably formed between the solenoid casing 30 and the flange portion 330b of the side ring 330.

In addition, since it is not necessary to prepare a lid member that closes the other axial end of the solenoid casing 30, separately from the side ring 330, the number of components can be reduced, and assembly work can be easily performed.

In addition, since the flange portion 330b of the side ring 330 and the lid portion 330d are integrally formed, contaminations can be prevented from intruding into the space S1 from the external space.

In addition, since the side ring 330 is provided with the protrusion 330e that abuts the end surface 35d of the plunger 35 at a position different from that of the through-hole 35a in an OFF state of the solenoid valve 10, the through-hole 35a of the plunger 35 is not closed by the lid portion 330d in an OFF state of the solenoid valve 10, and the fluid can smoothly move between the space S1 and the space S2.

Incidentally, a mode has been provided in which the side ring 330 of the present embodiment is attached by sandwiching the flange portion 330b between the crimping portion 30b of the solenoid casing 30 and the other axial end surface of the solenoid molded body 31, but the side ring 330 may be attached by being sandwiched between the crimping portion 30b of the solenoid casing 30 and the tubular body 7, and in this case, the flange portion 330b may not abut the other axial end surface of the solenoid molded body 31.

The embodiments of the present invention have been described above with reference to the drawings, but the specific configurations are not limited to the embodiments, and the present invention also includes changes or additions that are made without departing from the scope of the present invention.

For example, in the first and second embodiments, a mode has been provided in which the other end of the rod 5 is in contact with the end surface 35b of the plunger 35 and the one end of the rod 5 abuts the other end of the spool 22, but the rod 5 may be fixed to the plunger 35 or to the spool 22 by a fixing member such as a bolt, welding, bonding, or the like.

In addition, in the first and second embodiments, a mode has been provided in which in an ON state of the solenoid valves 1 and 10, the plunger 35 is prevented from coming into contact with the stator 32 by the damper member 6, but the plunger 35 may come into contact with the stator 32.

In addition, a mode has been provided in which in the first embodiment, the connector portion 37a of the solenoid molded body 31 is disposed on the one axial end side with respect to the flange portion 33b, and in the second embodiment, the connector portion 37a is disposed on the one axial end side with respect to the flange portion 330b, but the present invention is not limited to the mode, and a part of the connector portion may be disposed on a radially outer side of the annular outer peripheral surface of the flange portion. In other words, the flange portion may be disposed on the other axial end side with respect to a portion of the solenoid molded body disposed inside the solenoid casing in the radial direction, namely, a portion of the solenoid molded body other than the connector portion.

In addition, in the first and second embodiments, a mode has been provided in which the through-hole 35a is formed in the plunger 35, but the present invention is not limited to the mode, and instead of the through-hole 35a, a groove that allows communication between the space S1 and the space S2 may be formed in a side surface of the plunger 35.

In addition, in the first and second embodiments, a mode has been provided in which the space S1 on the other axial end side of the plunger 35 and the space S2 on the one axial end side of the plunger 35 do not communicate with the external space of the solenoid valve, but one of or both the spaces S1 and S2 may communicate with the external space of the solenoid valve. Incidentally, when both the spaces S1 and S2 communicate with the external space of the solenoid valve, the through-hole 35a may not be formed in the plunger 35 since each of the spaces S1 and S2 can breathe with the external space.

In addition, a mode has been provided in which the other end of the solenoid casing 30 is closed by the end plate 34 in the first embodiment and by the flange portion 330b of the side ring 330 in the second embodiment, but the present invention is not limited to the mode, and the solenoid casing may include a lid portion that closes the other end of the solenoid casing.

In addition, in the first and second embodiments, the side ring and the stator are separate bodies, but the side ring and the stator may be integrally formed. In this case, it is preferable that a portion in which a cross-sectional area of a magnetic flux flow passage is narrow is formed in the middle of a portion extending in the axial direction so as to act a strong magnetic force on the movable iron core.

In addition, in the embodiments, the spool-type solenoid valve using the spool as a valve body has been described, but the present invention is not limited to the configuration, and may be applied to a solenoid valve using a globe valve, a gate valve, or the like.

REFERENCE SIGNS LIST

1 Solenoid valve
2 Valve unit
3 Solenoid unit
10 Solenoid valve
30 Solenoid casing
30a Opening
30b Crimping portion
31 Solenoid molded body
32 Stator
33 Side ring (yoke)
33a Tubular portion
33b Flange portion
33c Annular outer peripheral surface
34 End plate (lid member)
34a Protrusion
35 Plunger (movable iron core)
35a Through-hole
36 Coil
37a Connector portion
330 Side ring
330a Tubular portion
330b Flange portion
330d Lid portion
330e Protrusion
S1 to S3 Space

The invention claimed is:
1. A solenoid valve, comprising:
a valve body;
a sleeve in which the valve body is accommodated;
a solenoid casing which is connected to the sleeve on a first end side in an axial direction of the solenoid valve, and which is closed on a second end side opposed to the first end side in the axial direction;
a solenoid molded body formed by molding a coil with resin and accommodated in the solenoid casing, the solenoid molded body including a connector portion having terminals electrically connected to the coil;

a yoke including a tubular portion disposed inside the solenoid molded body, and a flange portion projecting radially outward from an end portion of the tubular portion on the second end side; and a movable iron core disposed to be movable in the axial direction inside the yoke, wherein the valve body is moved together with the movable iron core by energizing a coil of the solenoid molded body, the flange portion has an annular outer peripheral surface that is continuous, and is disposed between the solenoid molded body and the second end side of the solenoid casing the solenoid molded body includes an abutting portion which abuts an end surface of the flange portion on a coil side, and the connector portion of the solenoid molded body is formed by extending part of the solenoid casing continuously from the abutting portion in an outward radial direction so as to protrude outside the solenoid casing.

2. The solenoid valve according to claim 1, wherein an end portion of the solenoid casing on the second end side is closed by a lid member, and the lid member and the flange portion abut each other in an annular shape in the axial direction.

3. The solenoid valve according to claim 2, wherein the lid member is made of a magnetic material.

4. The solenoid valve according to claim 1, wherein an end portion of the solenoid casing on the second end side is closed by the flange portion.

5. The solenoid valve according to claim 4, wherein the flange portion is crimp-fixed to the solenoid casing.

6. The solenoid valve according to claim 4, wherein a space on the second end side of the movable iron core does not communicate with and is partitioned off from an external space of the solenoid casing, a through-hole that allows communication between the space on the second end side of the movable iron core and a space on the first end side of the movable iron core is formed in the movable iron core, and the lid member includes a protrusion that is abuttable with respect to a portion of the movable iron core different from the through-hole.

7. The solenoid valve according to claim 5, wherein a space on the second end side of the movable iron core does not communicate with and is partitioned off from an external space of the solenoid casing, a through-hole that allows communication between the space on the second end side of the movable iron core and a space on the first end side of the movable iron core is formed in the movable iron core, and the lid member includes a protrusion that is abuttable with respect to a portion of the movable iron core different from the through-hole.

* * * * *